US010577099B2

(12) United States Patent
Akens et al.

(10) Patent No.: US 10,577,099 B2
(45) Date of Patent: Mar. 3, 2020

(54) INDUCTIVE LANDING APPARATUS FOR AN UNMANNED AERIAL VEHICLE

(71) Applicant: MOTOROLA SOLUTIONS, INC., Chicago, IL (US)

(72) Inventors: Jody H. Akens, Weston, FL (US); Dennis A. Byk, Ft. Lauderdale, FL (US); Anthony J. Suppelsa, Parkland, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 161 days.

(21) Appl. No.: 15/702,000

(22) Filed: Sep. 12, 2017

(65) Prior Publication Data
US 2019/0077505 A1   Mar. 14, 2019

(51) Int. Cl.
| | | |
|---|---|---|
| B64C 39/02 | (2006.01) | |
| H02J 7/00 | (2006.01) | |
| H02J 50/10 | (2016.01) | |
| H02J 7/02 | (2016.01) | |

(52) U.S. Cl.
CPC .......... *B64C 39/024* (2013.01); *H02J 7/0042* (2013.01); *H02J 50/10* (2016.02); *B64C 2201/042* (2013.01); *B64C 2201/066* (2013.01); *B64C 2201/141* (2013.01); *H02J 7/025* (2013.01)

(58) Field of Classification Search
CPC ............ B64C 2201/066; B64C 39/024; B64C 2201/042; B64C 2201/141; H02J 7/025
See application file for complete search history.

(56) References Cited

U.S. PATENT DOCUMENTS

| | | | |
|---|---|---|---|
| 4,240,030 A | 12/1980 | Bateman et al. | |
| 4,532,471 A | 7/1985 | Hurley | |
| 7,318,564 B1 | 1/2008 | Marshall | |
| 7,543,780 B1 * | 6/2009 | Marshall | B64C 39/024 244/194 |

(Continued)

FOREIGN PATENT DOCUMENTS

CN    20410148    1/2015

OTHER PUBLICATIONS

Prigg, "Researchers show off "bird" drones that can land on power lines to recharge themselves," article (2014) 7 pages.

*Primary Examiner* — John Olszewski
*Assistant Examiner* — Tiffany K Luu
(74) *Attorney, Agent, or Firm* — Michael Best & Friedrich LLP

(57) ABSTRACT

An inductive landing apparatus for an unmanned aerial vehicle and methods of operation. One method includes locating, with a flight controller, an overhead power line. The method includes controlling a flight system communicatively coupled to the flight controller to bring the unmanned aerial vehicle in proximity to the overhead power line. The method includes controlling the flight system to position the unmanned aerial vehicle such that a first inductive clamp and a second inductive clamp of the unmanned aerial vehicle are aligned with the overhead power line. The method includes causing the first and second inductive clamps to open. The method includes causing the first and second inductive clamps to close around the overhead power line. The method includes inductively coupling the first and second inductive clamps to the overhead power line.

18 Claims, 15 Drawing Sheets

(56) References Cited

U.S. PATENT DOCUMENTS

| | | | |
|---|---|---|---|
| 7,714,536 B1* | 5/2010 | Silberg | B64C 39/024 |
| | | | 320/108 |
| 9,387,928 B1* | 7/2016 | Gentry | B64C 39/024 |
| 2007/0200553 A1 | 8/2007 | Morrison | |
| 2008/0109387 A1 | 5/2008 | Deaver et al. | |
| 2010/0007336 A1 | 1/2010 | de Buda | |
| 2015/0274322 A1 | 10/2015 | Alammari | |
| 2016/0023761 A1* | 1/2016 | McNally | B64C 39/024 |
| | | | 29/407.01 |
| 2016/0200207 A1* | 7/2016 | Lee | B60L 11/1824 |
| | | | 320/109 |
| 2017/0015415 A1* | 1/2017 | Chan | B64C 39/024 |
| 2017/0200530 A1* | 7/2017 | Davis | H01B 7/28 |
| 2017/0344000 A1* | 11/2017 | Krishnamoorthy | B64C 39/024 |

* cited by examiner

INDUCTIVE LANDING APPARATUS FOR AN UNMANNED AERIAL VEHICLE

BACKGROUND OF THE INVENTION

Drones and other unmanned aerial vehicles (UAVs) are increasingly used for public safety, commercial, and other operations. For example, unmanned aerial vehicles may be deployed for surveillance, tracking a suspect, search and rescue operations, and the like. Unmanned aerial vehicles may also be deployed to retrieve or deliver payloads over long distances. Unmanned aerial vehicles may also be deployed for tracking weather conditions and gathering 3-D mapping data. In some operations, multiple unmanned aerial vehicles operate as a fleet to perform their operations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
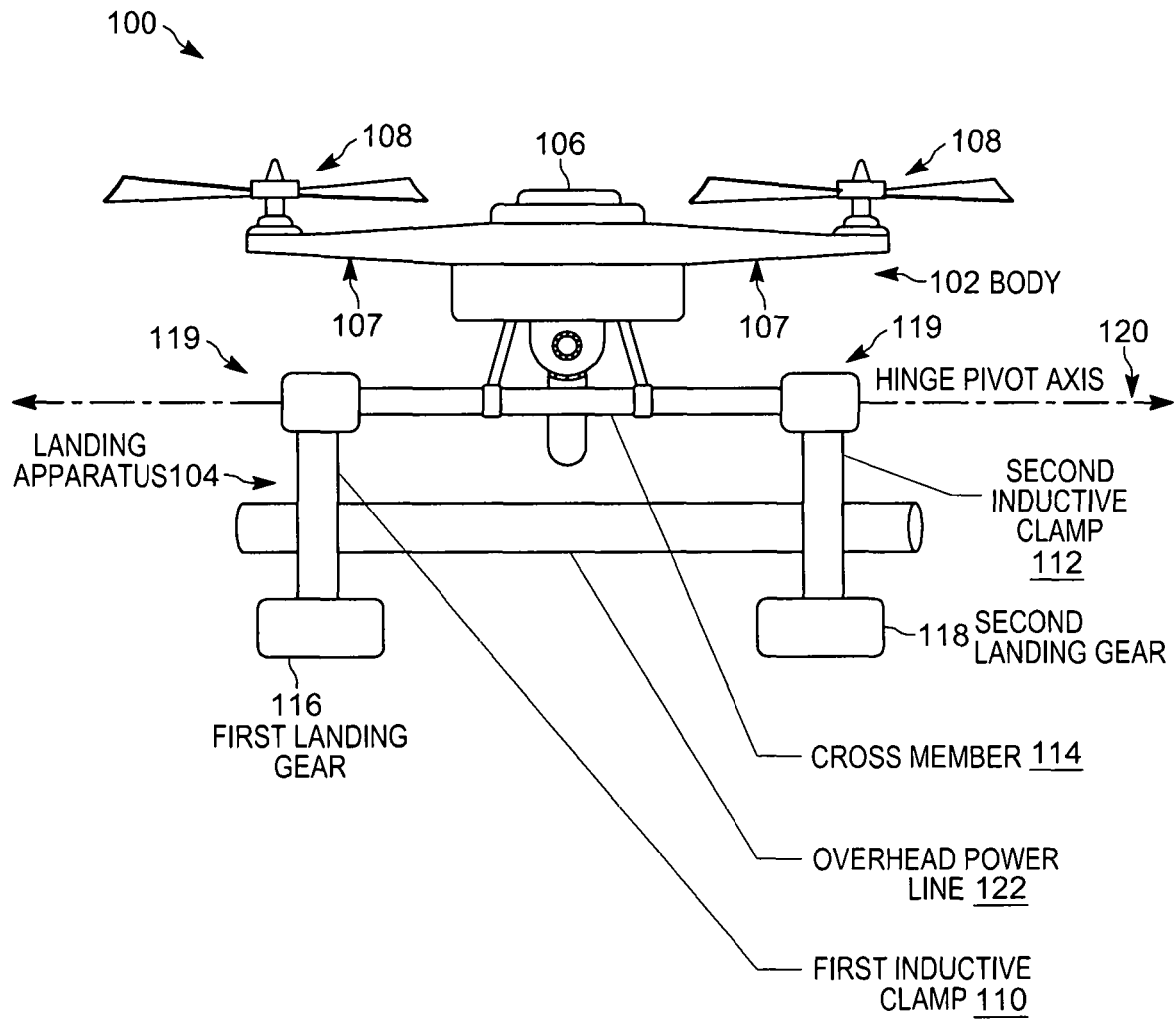
FIG. 1 is a diagram of an unmanned aerial vehicle in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some unmanned aerial vehicle operations require near continuous operation, over long distances, for long periods of time, or both. However, the limited battery capacity of the unmanned aerial vehicles limits their effective operation time. To recharge their batteries, some unmanned aerial vehicles return automatically to a charging station. However, this requires deploying remote charging stations, or recalling the unmanned aerial vehicles to a home base for charging. This limits the range of the unmanned aerial vehicles, and limits the ability of users to quickly deploy the unmanned aerial vehicles into new areas where no charging stations exist. Accordingly, embodiments described herein provide for, among other things, an inductive landing apparatus and methods of operation that enable unmanned aerial vehicles to recharge using conventional power lines. Using such embodiments, unmanned aerial vehicles may achieve expanded operating ranges, in both time and distance. Furthermore, such embodiments allow for unmanned aerial vehicles to be deployed into any area where electrical utility lines are present within the operating range of the unmanned aerial vehicles.

One example embodiment provides an unmanned aerial vehicle. The unmanned aerial vehicle includes a flight controller, a flight system communicatively coupled to the flight controller, a first inductive clamp, a second inductive clamp, and an inductive circuit electrically coupled to the first and second inductive clamps. The flight controller is configured to locate an overhead power line. The flight controller is configured to control the flight system to bring the unmanned aerial vehicle in proximity to the overhead power line. The flight controller is configured to control the flight system to position the unmanned aerial vehicle such that the first and second inductive clamps are aligned with the overhead power line. The flight controller is configured to cause the first and second inductive clamps to open. The flight controller is configured to cause the first and second inductive clamps to close around the overhead power line. The flight controller is configured to inductively couple the first and second inductive clamps to the overhead power line.

Another example embodiment provides a method for operating an unmanned aerial vehicle. The method includes locating, with a flight controller, an overhead power line. The method includes controlling a flight system communicatively coupled to the flight controller to bring the unmanned aerial vehicle in proximity to the overhead power line. The method includes controlling the flight system to position the unmanned aerial vehicle such that a first inductive clamp and a second inductive clamp of the unmanned aerial vehicle are aligned with the overhead power line. The method includes causing the first and second inductive clamps to open. The method includes causing the first and second inductive clamps to close around the overhead power line. The method includes inductively coupling the first and second inductive clamps to the overhead power line.

One example embodiment provides an unmanned aerial vehicle. The unmanned aerial vehicle includes a flight controller, an electromagnetic sensor coupled to the flight controller, a flight system communicatively coupled to the flight controller, a battery, a first clamp including a first motor, a second clamp including a second motor, an inductive wire line mechanically coupled to the first clamp and the second clamp, and a charging circuit electrically coupled to the inductive wire line and the battery. The flight controller is configured to, when a charge level for the battery falls below a predetermined threshold, locate an overhead power line. The flight controller is configured to control the flight system to bring the unmanned aerial vehicle in proximity to the overhead power line. The flight controller is configured to control the flight system to position the unmanned aerial vehicle such that the first and second clamps are aligned with the overhead power line. The flight controller is configured to cause the first and second clamps to open. The flight controller is configured to cause the first and second clamps to close around the overhead power line. The flight controller is configured to receive, from the electromagnetic sensor, a characteristic of an electromagnetic field of the overhead power line. The flight controller is configured to control the first and second motors to operate in opposite directions, based on the characteristic of the electromagnetic field, to twist the inductive wire line into at least one loop surrounding the overhead power line. The flight controller is configured to inductively charge the battery via the charging circuit and the inductive wire line.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example embodiment of an unmanned aerial vehicle 100. As an example, the unmanned aerial vehicle 100 is illustrated as a quad-copter style drone, including a body 102 and a landing apparatus 104. The body 102 includes a hull 106, which houses the electronics (described below) that power, drive, and control the unmanned aerial vehicle 100. The unmanned aerial vehicle 100 also includes arms 107 that support four propellers 108. When rotated, the propellers create a fluid flow used in take-off, flight, and landing. The landing apparatus 104 includes a first inductive clamp 110 and a second inductive clamp 112. The first inductive clamp 110 and the second inductive clamp 112 are attached to a cross member 114, which is coupled to the body 102. Attached to the first inductive clamp 110 and the second inductive clamp 112 are a first landing gear 116 and a second landing gear 118, respectively. In some embodiments, first landing gear 116 and the second landing gear 118 are electrically isolated from the first inductive clamp 110 and the second inductive clamp 112 (for example, using a suitable insulating material). The first inductive clamp 110 and the second inductive clamp 112 are able to open and close using hinges 119, which operate along a hinge pivot axis 120, for example, to enclose an overhead power line 122. As described more particularly below, the first inductive clamp 110 and the second inductive clamp 112 include wire windings and ferrite cores arranged to allow them to inductively couple to the overhead power line 122, for example, to provide an electric current for use by the unmanned aerial vehicle 100.

The first inductive clamp 110 and the second inductive clamp 112 may also be referred to herein as inductive charging clamps.

Figure 2A:
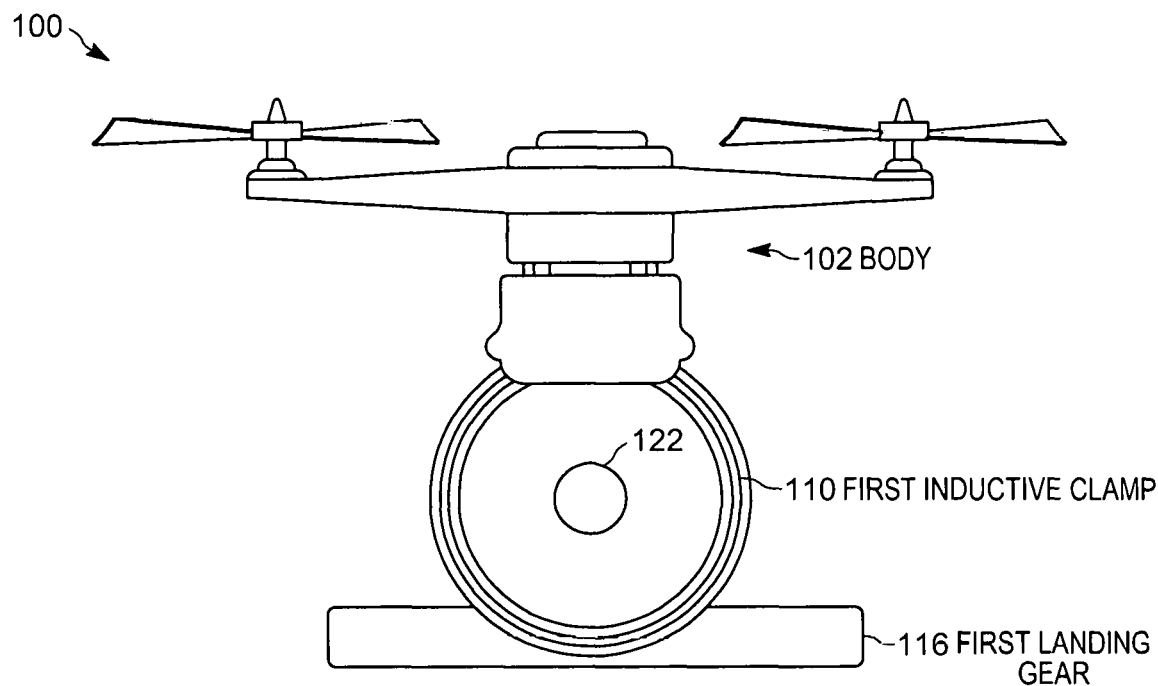
FIGS. 2A-2B illustrate side views of the unmanned aerial vehicle of FIG. 1 in accordance with some embodiments.

FIG. 2A illustrates a side view of the unmanned aerial vehicle 100. For ease of description, this and other side views presented herein include labeling for only the first inductive clamp 110 and the first landing gear 116. In the embodiments illustrated, the first inductive clamp 110 and the first landing gear 116 and the second inductive clamp 112 and the second landing gear 118 are identically shaped and aligned so that only the first inductive clamp 110 and the first landing gear 116 are visible. Descriptions of the first inductive clamp 110 and the first landing gear 116 apply also to the second inductive clamp 112 and the second landing gear 118. However, this should not be considered limiting. In other embodiments, the first inductive clamp 110 and the first landing gear 116 and the second inductive clamp 112 and the second landing gear 118 may be shaped or configured differently from one another, or from the examples illustrated herein.

Figure 2B:
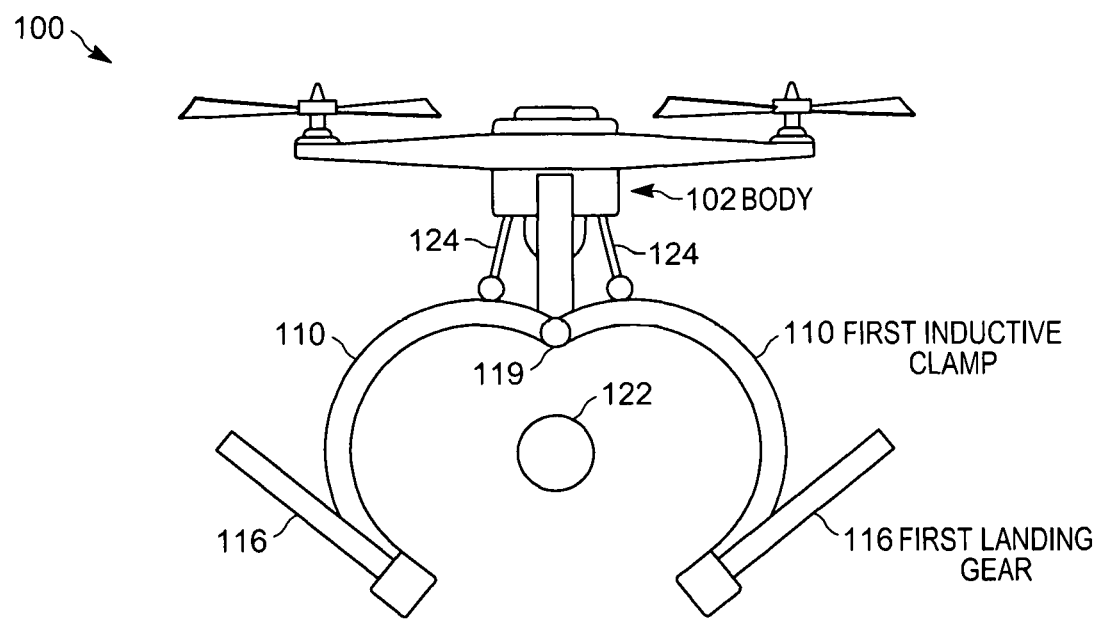
Figure 3:
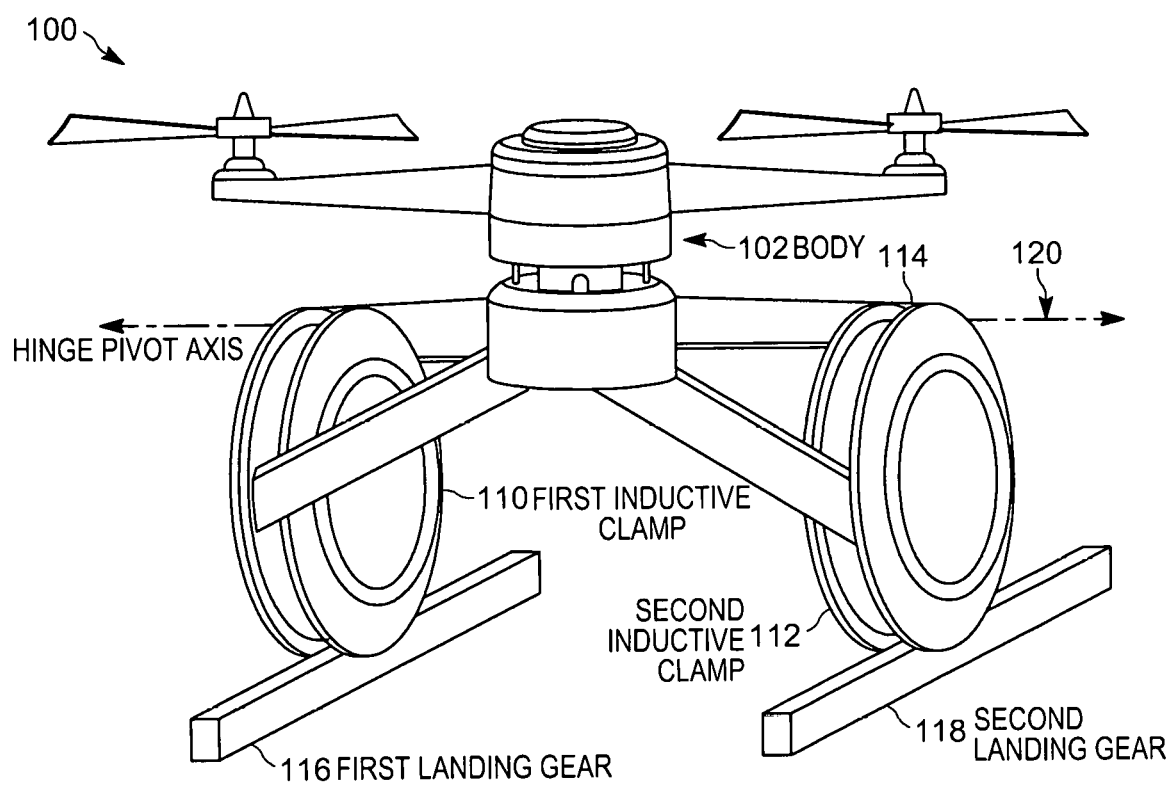
FIG. 3 illustrates a perspective view of the unmanned aerial vehicle of FIG. 1 in accordance with some embodiments.

As illustrated in FIG. 2A, the example first inductive clamp 110 is annular, and sized such that it is able to surround the overhead power line 122. As illustrated in FIG. 2B, the first inductive clamp 110 and the first landing gear 116 are hinged and split at the bottom, and may be opened or closed, for example, using a motor (not shown) and one or more linkages 124. FIG. 3 illustrates a perspective view of the unmanned aerial vehicle 100. As illustrated in FIG. 3, the first inductive clamp 110 and the second inductive clamp 112 are aligned with each other along the cross member 114 such that they can simultaneously open and close along the hinge pivot axis 120.

Figure 4:
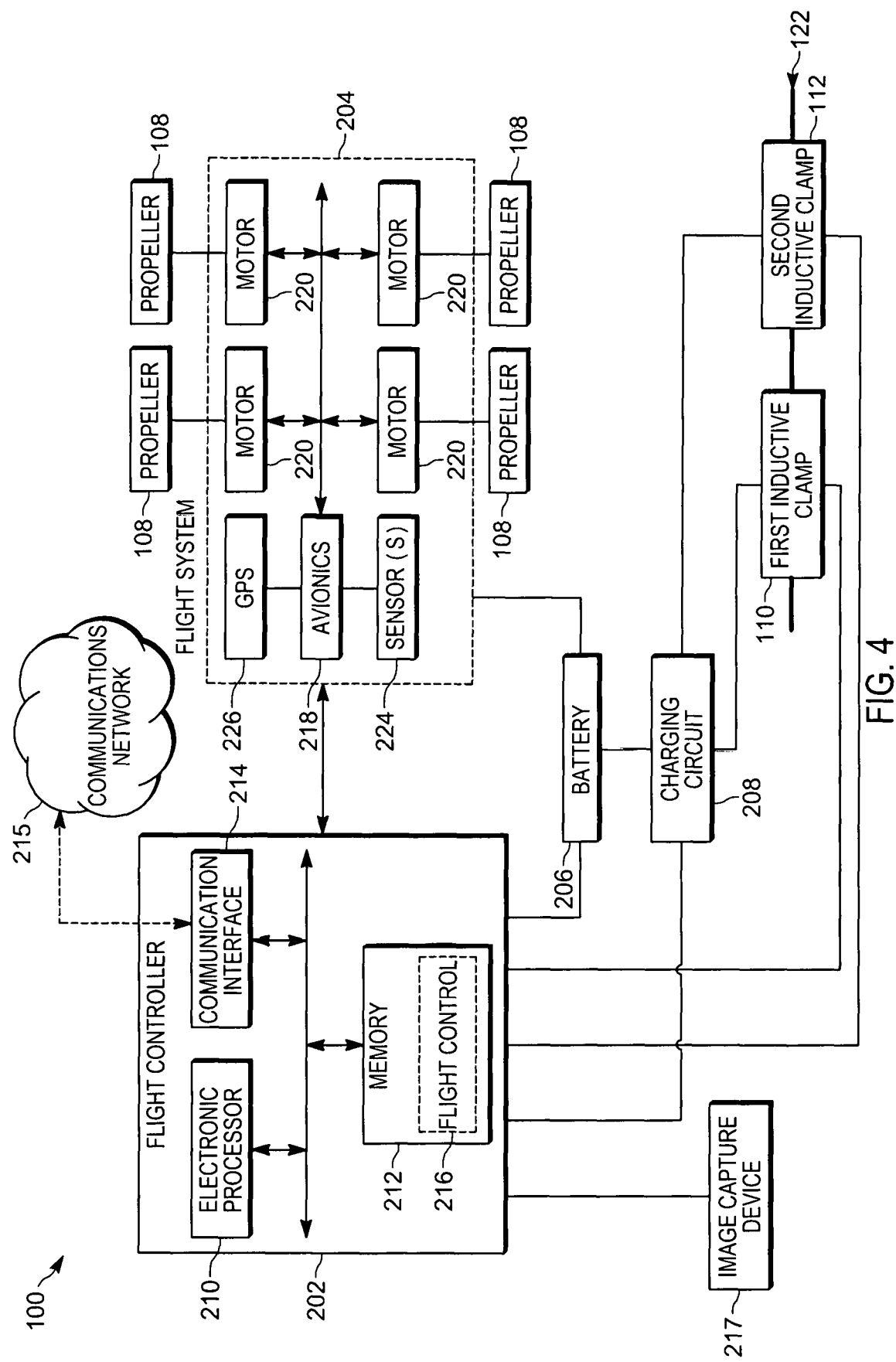
FIG. 4 is a block diagram of some systems of the unmanned aerial vehicle of FIG. 1 in accordance with some embodiments.

FIG. 4 is a block diagram of an example embodiment of the unmanned aerial vehicle 100. The unmanned aerial vehicle 100 includes a flight controller 202, a flight system 204, a battery 206, and a charging circuit 208. It should be understood that, in other constructions, the unmanned aerial vehicle 100 includes additional, fewer, or different components than those illustrated. As illustrated in FIG. 4, the foregoing components are coupled to each other by or through one or more control, data, or power buses that enable transfer of power and communication therebetween. Other embodiments may include other configurations.

As illustrated in FIG. 4, the flight controller 202 includes an electronic processor 210 (for example, a microprocessor, application-specific integrated circuit (ASIC), or other suitable electronic device), a memory 212, and a communication interface 214. The electronic processor 210, the memory 212, and the communication interface 214 are communicatively coupled over one or more communication lines or buses, wirelessly, or combinations thereof.

The communication interface 214 may include a wireless transmitter or transceiver for wirelessly communicating to devices external to the unmanned aerial vehicle 100, for example, over a communications network 215.

The memory 212 includes a non-transitory, computer-readable storage medium storing program instructions and data. The electronic processor 210 is configured to retrieve from the memory 212 and execute, among other things, software (executable instructions) to perform a set of functions, including the methods described herein. As illustrated in FIG. 2, in some embodiments, the memory 212 stores a flight control program 216. It should be understood that the memory 212 may store additional applications, data, or combinations thereof. Also, in some embodiments, the flight control program 216 may be stored in a separate memory.

In some embodiments, the unmanned aerial vehicle 100 includes an image capture device 217 (for example, a camera) coupled to the flight controller 202. The image capture device 217 captures images and video streams by, for example, sensing light in at least the visible spectrum. In some embodiments, the image capture device 217 captures thermal images using the infrared spectrum. The image capture device 217 communicates the captured images and video streams to the flight controller 202, for example, via the communication interface 214. It should be noted that the terms "image" and "images," as used herein, may refer to one or more digital images captured by the image capture device 217 and processed by the electronic processor 210. Further, the terms "image" and "images," as used herein, may refer to still images or sequences of images (for example, a video stream). In some embodiments, the flight controller 202 processes images received from the image capture device 217 to detect its surroundings and for navigation or flight control.

The flight system 204 includes the software and hardware components that are controlled by the flight controller 202 to take off, fly, and land the unmanned aerial vehicle 100. The control of unmanned aerial vehicles to maneuver and fly is known, and will not be described in detail herein. The flight system 204 includes an avionics system 218 and four motors 220, which drive four propellers 108. As noted above the example unmanned aerial vehicle 100 described herein is a quadcopter style drone. Other embodiments are possible.

The avionics system 218 includes the electronic components (for example, motor controllers, gyroscopes, accelerometers, altimeters, and the like) for operating the motors 220 and the propellers 108 to accomplish flight and navigation of the unmanned aerial vehicle 100. The avionics system 218 is coupled to (or may in some embodiments include) one or more sensors 224 and a geolocation system 226 (for example, a global positioning system (GPS) receiver). In some embodiments, the one or more sensors 224 include one or more electromagnetic sensors, for example, for sensing electromagnetic fields.

The battery 206 is a rechargeable battery (for example, a Lithium polymer battery) that provides electrical power to the flight controller 202, the flight system 204, and other components of the unmanned aerial vehicle 100. The charging circuit 208 (also referred to herein as an inductive circuit) includes suitable electronic components (for example, transformers, rectifiers, and regulators) for charging the battery 206 with, for example, current generated by the overhead power line 122 in the first inductive clamp 110 and the second inductive clamp 112. The charging circuit 208 also includes components for monitoring the charge level of the battery 206 and communicating the charge level (as well as current and voltage levels within the charging circuit 208) to the flight controller 202.

Figure 5:
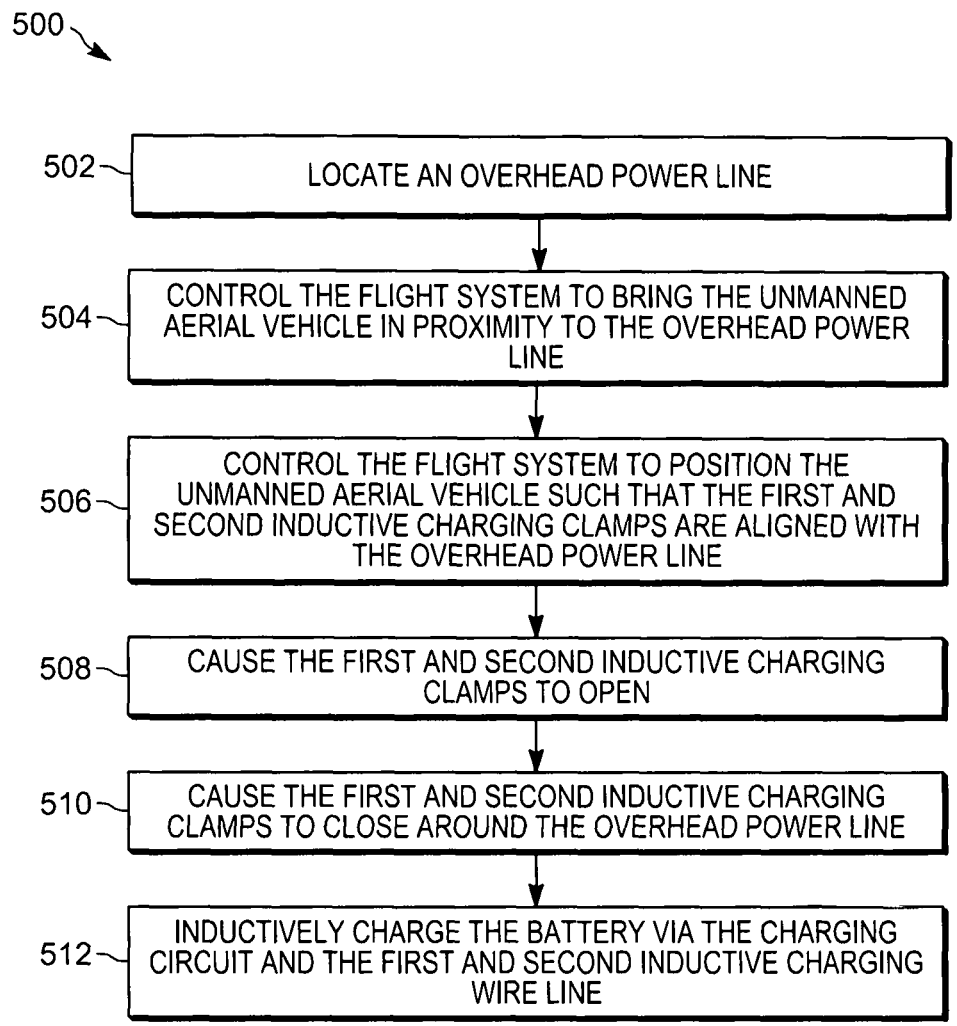
FIG. 5 is a flowchart of a method for operating the unmanned aerial vehicle of FIG. 1 in accordance with some embodiments.

As noted above, the battery 206 has a limited capacity, which, in turns limits the operational range of the unmanned aerial vehicle 100. Continued operation of the unmanned aerial vehicle 100 requires recharging of the battery 206. Accordingly, FIG. 5 illustrates an example method 500 for operating the unmanned aerial vehicle 100 to recharge the battery 206 using overhead power lines. The method 500 is described as being performed by the flight controller 202. However, it should be understood that in some embodiments, portions of the method 500 may be performed by other components, including for example, the avionics system 218. In some embodiments, portions of the method 500 may be performed by remote systems external to the unmanned aerial vehicle 100, for example, a central flight control or monitoring system communicating with the flight controller 202 via the communication interface 214.

In some embodiments, as the flight controller 202 operates the unmanned aerial vehicle 100, it monitors (for example, using the charging circuit 208) the charge level for the battery 206. When a charge level for the battery 206 falls below a predetermined threshold, the flight controller 202 determines that the battery 206 needs to be recharged. The threshold may be determined using, for example, the flight time remaining, the distance to the nearest overhead power line, the power level required to safely land the unmanned aerial vehicle 100, and other similar factors.

At block 502, the flight controller 202 locates an overhead power line. For example, the electronic processor 210 may compare the current location of the unmanned aerial vehicle 100 to a database of overhead power line locations (for example, stored in the memory 212). In another example, the flight controller 202 may query a remote server with a request for an overhead power line location. In some embodiments, the flight controller 202 locates an overhead power line based on images received from the image capture device 217. For example, the flight controller 202 may analyze the images received using an object classifier. In another example, the flight controller 202 uses thermal imaging to locate an overhead power line based on its heat signature. In some embodiments, the flight controller 202 locates the overhead power line using one or more electromagnetic sensors (for example, the sensor 224) to sense the magnetic fields of the power line. In some embodiments, the flight controller 202 uses data from a database or from one or more electromagnetic sensors to locate an overhead power line with suitable electrical characteristics (for example, a voltage level) for charging the battery 206. In some embodiments, the flight controller 202 locates an overhead power line by using a radiofrequency beacon. In some embodiments, the flight controller 202 requests and receives permission to attach to the selected overhead power line. For example, the flight controller 202 may transmit a request to and receive a reply from a utility computer system via the communication interface 214.

Regardless of how the flight controller 202 determines the location of an overhead power line, at block 504, the flight controller 202 controls the flight system 204 to bring the unmanned aerial vehicle 100 in proximity to the overhead power line. In some embodiments, the flight controller 202 controls the flight system 204 to navigate the unmanned aerial vehicle 100 along the overhead power line until it locates a suitable position for attachment. For example, the flight controller 202 may use thermal images received from the image capture device 217 to locate a position on the overhead powerline that is cooler relative to other positions, or that has a temperature within a predetermined range.

Figure 6A:
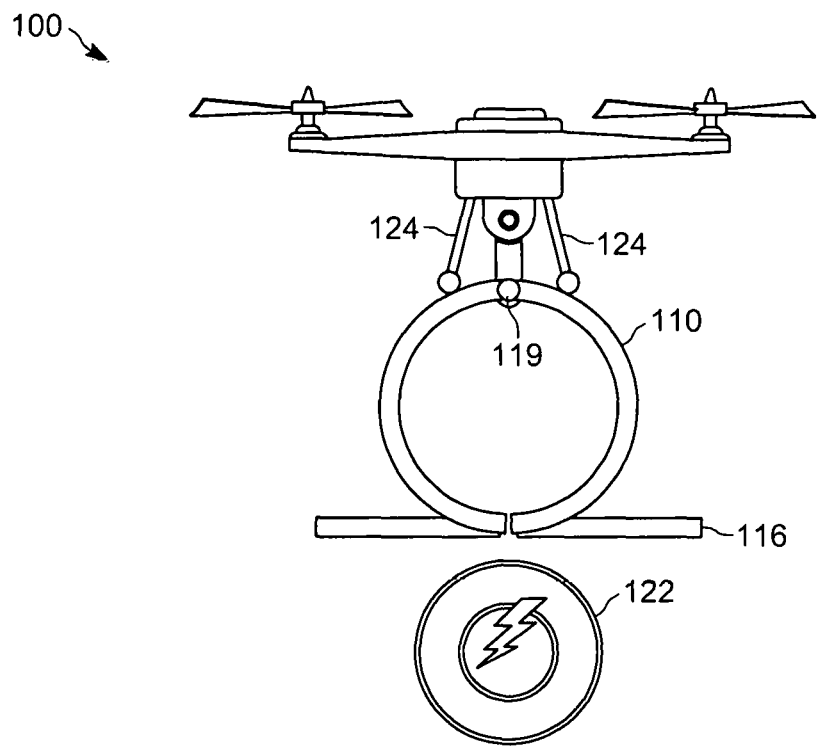
FIGS. 6A-6E illustrate the unmanned aerial vehicle of FIG. 1 engaging with an overhead power line in accordance with some embodiments.

At block 506, the flight controller 202 controls the flight system 204 to position the unmanned aerial vehicle 100 such that the first and second inductive clamps 110, 112 are aligned with the overhead power line 122. (For example, as illustrated in FIG. 6A). In some embodiments, the flight controller 202 receives, from an electromagnetic sensor, a characteristic of an electromagnetic field of the overhead power line 122, and controls the flight system 204 to position the unmanned aerial vehicle 100 such that the first and second inductive clamps 110, 112 are aligned with the overhead power line 122 based on the characteristic of the electromagnetic field. For example, based on readings of the magnetic field produced by the overhead power line 122 and using the "right hand rule," the flight controller 202 may determine the most efficient placement of the first and second inductive clamps 110, 112 and orient the unmanned aerial vehicle 100 with respect to the current flow in the overhead power line 122.

Figure 6B:
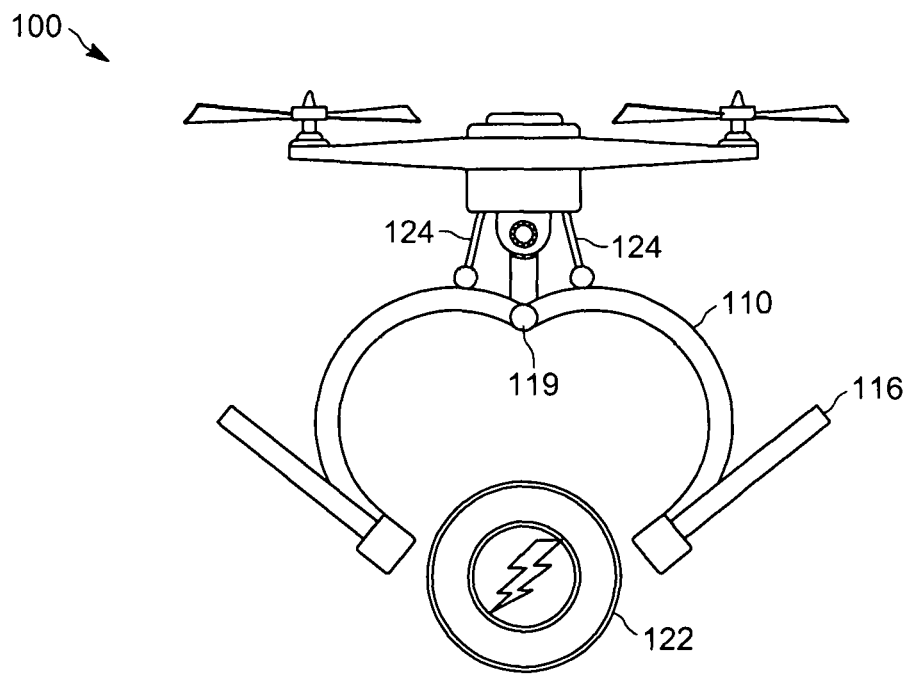
Figure 6C:
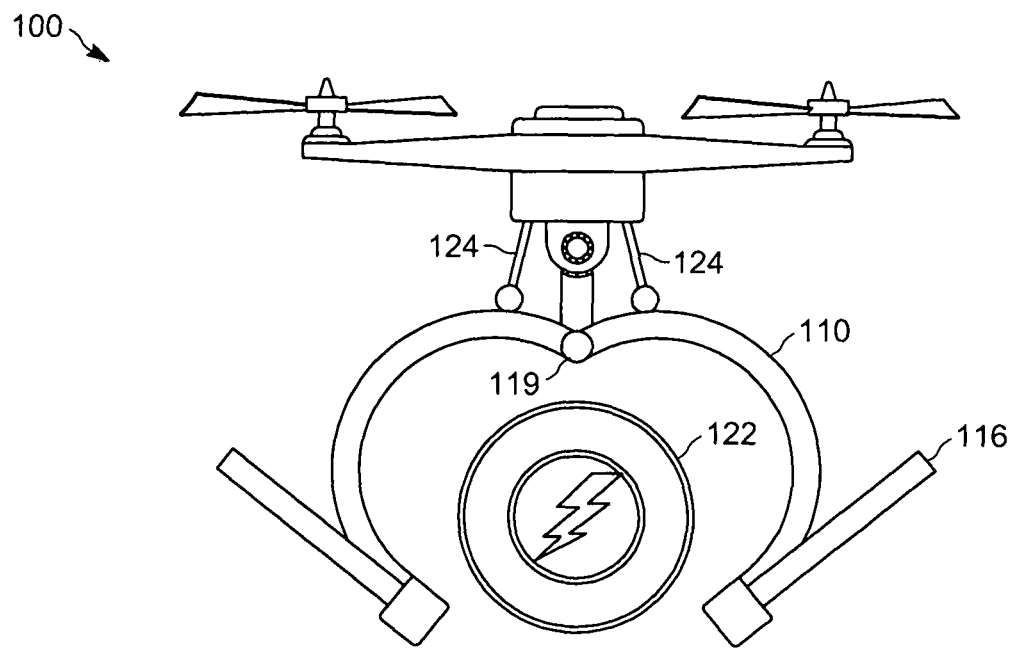

At block 508, the flight controller 202 causes the first and second inductive clamps to open, as illustrated in FIG. 6B. After the first and second inductive clamps 110, 112 are aligned with the overhead power line 122 and opened, the flight controller 202 controls the flight system 204 to position the unmanned aerial vehicle 100 such that the first and second inductive clamps 110, 112 substantially surround the overhead power line 122, as illustrated in FIG. 6C. The first and second inductive clamps 110, 112 substantially surround the overhead power line 122 when the first and second inductive clamps 110, 112 can be closed to enclose the overhead power line 122 without being obstructed by the overhead power line 122.

Figure 6D:
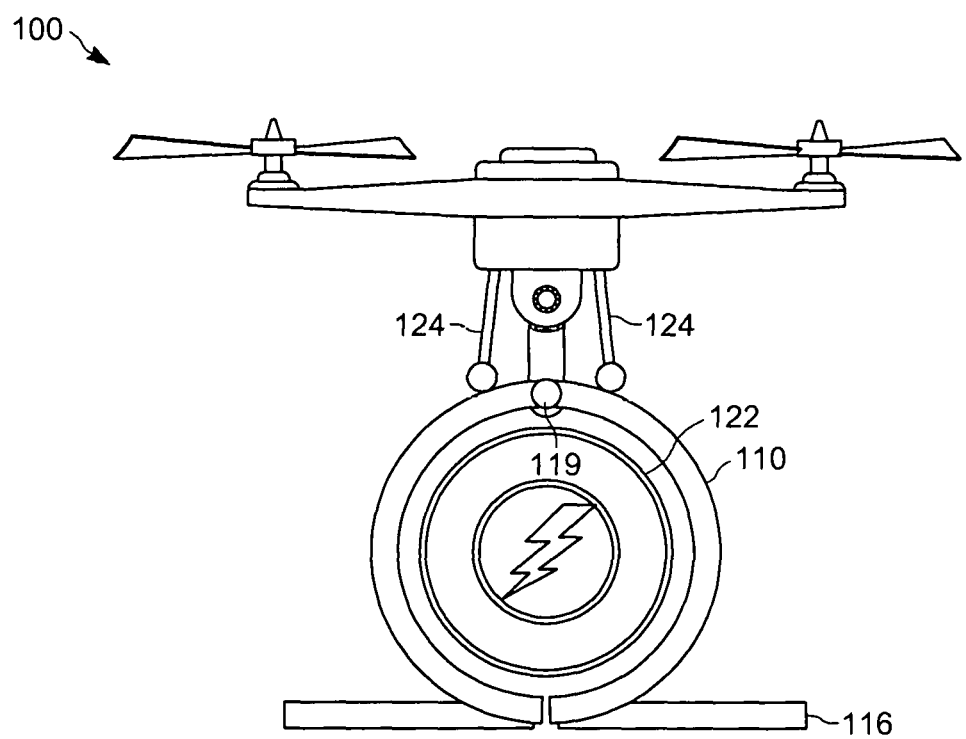
Figure 6E:
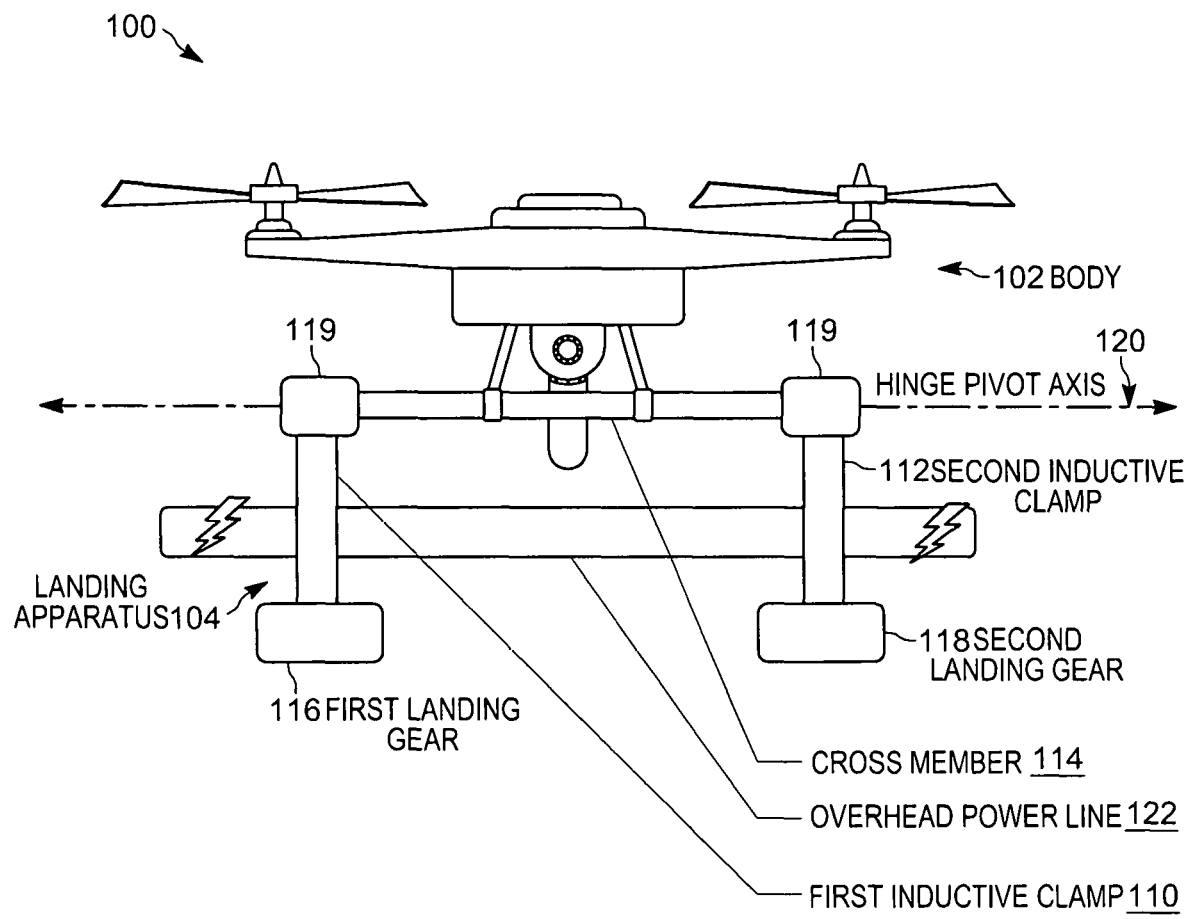

At block 510, the flight controller 202 causes the first and second inductive clamps 110, 112 to close around the overhead power line, as illustrated in FIGS. 6D and 6E.

Figure 7A:
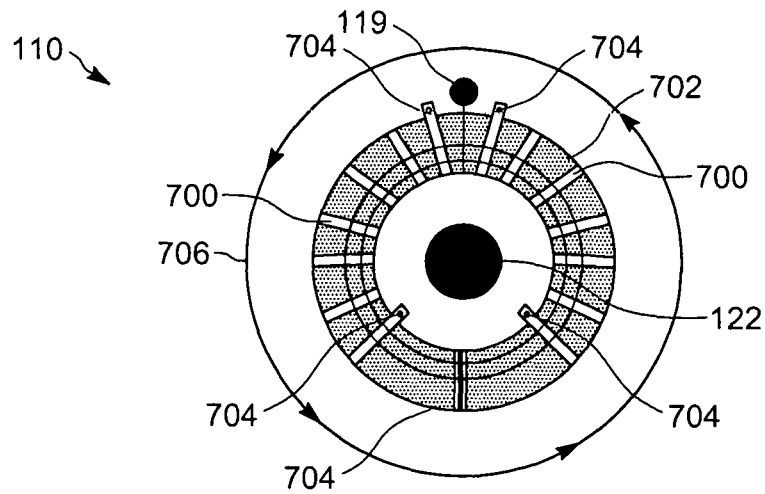
FIGS. 7A-7C illustrate an inductive clamp of the unmanned aerial vehicle of FIG. 1 in accordance with some embodiments.
Figure 7B:
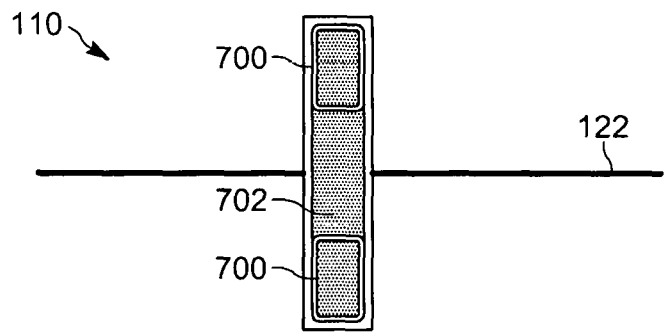

At block 512, the flight controller 202 inductively couples the first and second inductive clamps 110, 112 to the overhead power line 122 to inductively charge the battery 206 via the charging circuit 208 and the first and second inductive charging clamps 110, 112. As illustrated in FIG. 7A, the inductive charging clamps include one or more windings 700 (for example, wire windings) situated around a ferrite core 702, covered in a suitable insulator (not shown). The windings 700 are electrically coupled to the charging circuit 208 by via the lap points 704. The number of windings 700 around the ferrite core can be optimized for the voltage levels of the overhead power lines expected to be encountered. In some embodiments, the windings 700 span the opening of the inductive charging clamp, and are disconnected and reconnected as the inductive charging clamp opens and closes. In some embodiments, the windings 700 may be toroidal circuits, one on each half of the inductive charging clamp. This allows for the inductive charging clamp to open without breaking electrical connections. FIG. 7B illustrates a side view of FIG. 7A. When the inductive charging clamps are positioned around the overhead power line 122, the power line's magnetic field 706 (according to Faraday's law of induction) induces an alternating electrical current in the windings 700. This alternating electrical current is fed to the charging circuit 208, which uses the current to charge the battery 206.

Figure 7C:
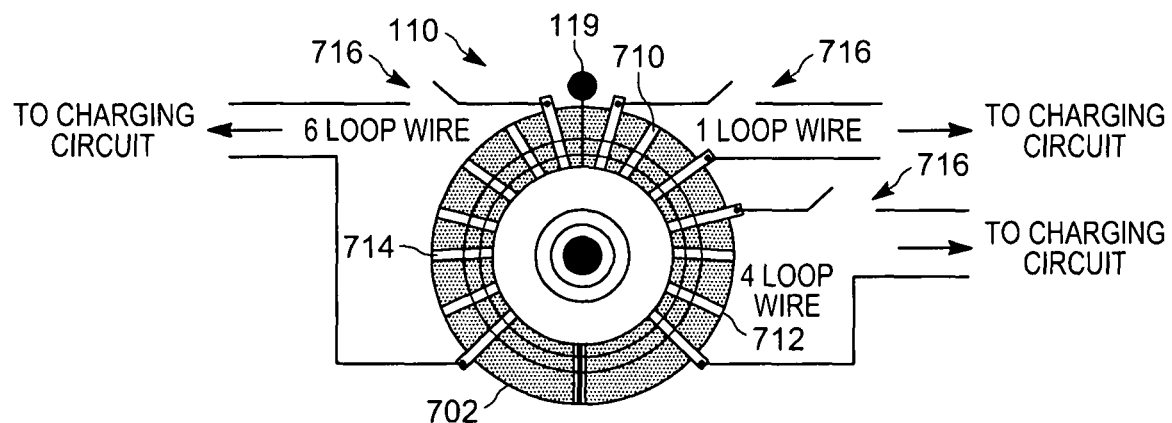

As illustrated in FIG. 7C, through the use of multiple different windings around the ferrite core 702, a variable amount of inductive coupling can be achieved. In the example, illustrated, winding 710 is a single loop winding, winding 712 is a four loop winding, and winding 714 is a six loop winding. Alternative embodiments may include more or fewer windings, and windings including differing numbers of loops. Each of the windings 710, 712, and 714 is electrically coupled to the charging circuit 208 via a switch 716. In such embodiments, the switches 716 are controllable by the flight controller 202 to couple and decouple the windings 710, 712, and 714 to and from the charging circuit 208. In one embodiment, a winding with a lower level of inductive coupling, for example, the winding 710, is activated. The current or voltage levels can be monitored by the charging circuit 208, and, if more coupling is desired, additional windings (for example, the winding 712 and the winding 714) can be activated until the desired amount of coupling is achieved.

In some embodiments, while inductively charging the battery, the flight controller 202 controls the flight system 204 such that the unmanned aerial vehicle 100 remains positionally stable. For example, the unmanned aerial vehicle 100 may continue to operate in a hover mode and holding its position (See FIG. 6E).

Figure 8A:
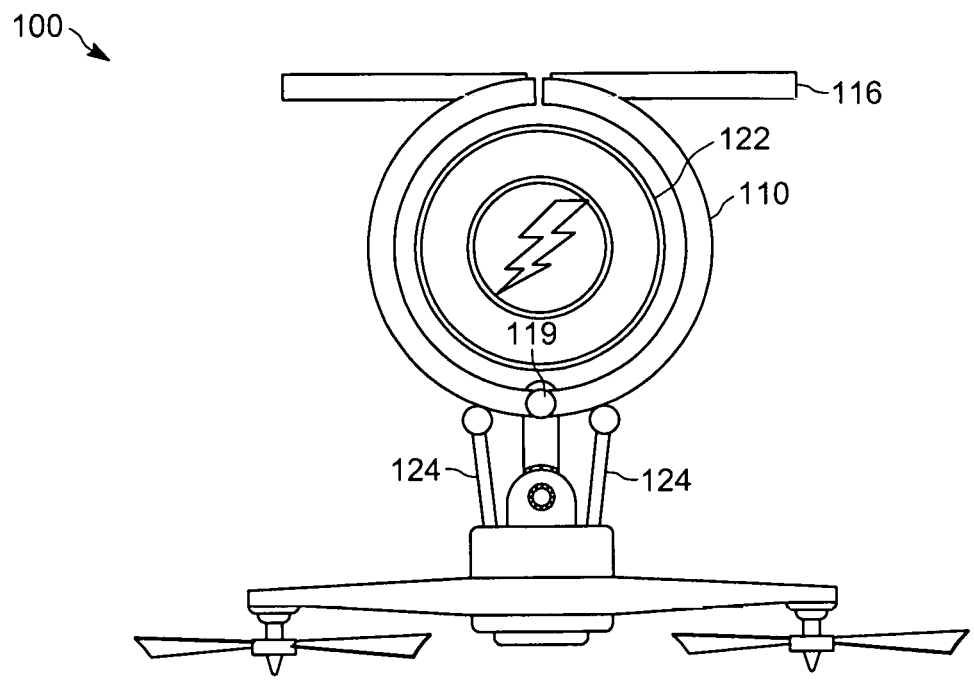
FIGS. 8A-8B illustrate the unmanned aerial vehicle of FIG. 1 engaging with an overhead power line in accordance with some embodiments.

In some embodiments, while inductively charging the battery, the flight controller 202 causes the flight system 204 to enter an idle state such that the unmanned aerial vehicle 100 hangs from the overhead power line by the first and second inductive charging clamps 110, 112 in a substantially vertical position, as illustrated in FIG. 8A. In such embodiments, the flight system 204 and other components of the unmanned aerial vehicle 100 are not drawing current to operate the flight system 204, and the battery 206 may thereby be charged more quickly.

Figure 8B:
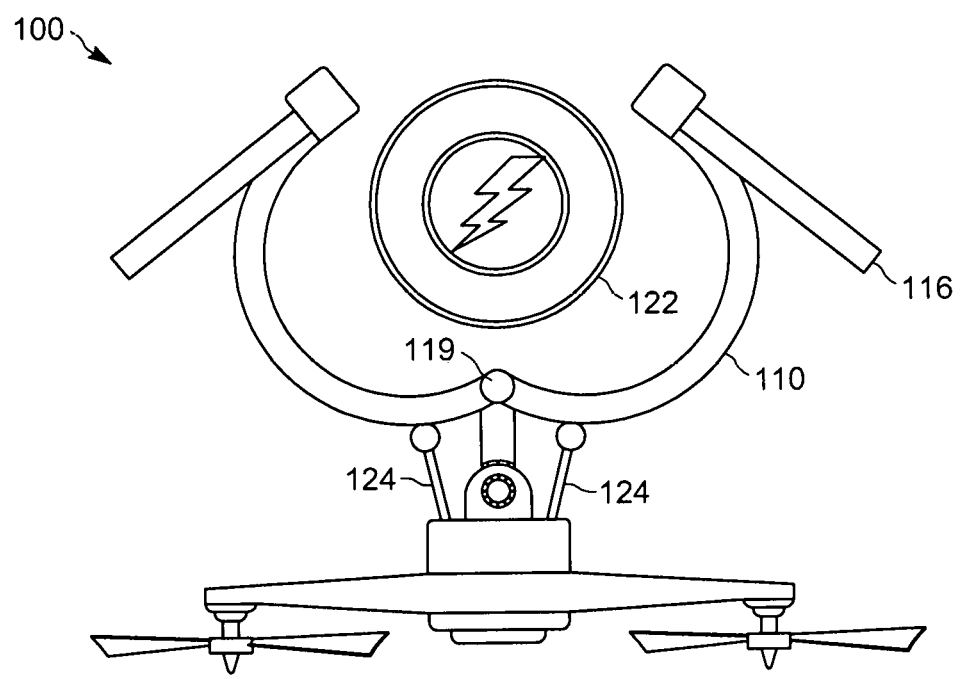

In some embodiments, while hanging upside down, the flight controller 202 may receive, for example, via the communication interface 214, a call to service. A call to service may be sent from, for example, a computer aided dispatch system. In some embodiments, the call to service may be received from another unmanned aerial vehicle. Regardless of how the call to service is received, in response to receiving the call to service, the flight controller 202 causes the first and second inductive charging clamps 110, 112 to open, as illustrated in FIG. 8B, which causes the unmanned aerial vehicle 100 to drop from the overhead power line 122. When the unmanned aerial vehicle 100 has cleared the overhead power line 122, for example, as determined by the sensor 224 or images received from the image capture device 217, the flight controller 202 causes the flight system 204 to enter an active state, and controls the flight system 204 to place the unmanned aerial vehicle 100 into a flight stable position (that is, to right itself such that it is able to navigate and fly). In some embodiments, the flight controller 202 causes the flight system 204 to enter an active state prior to disengaging from the overhead power line 122.

Figure 9:
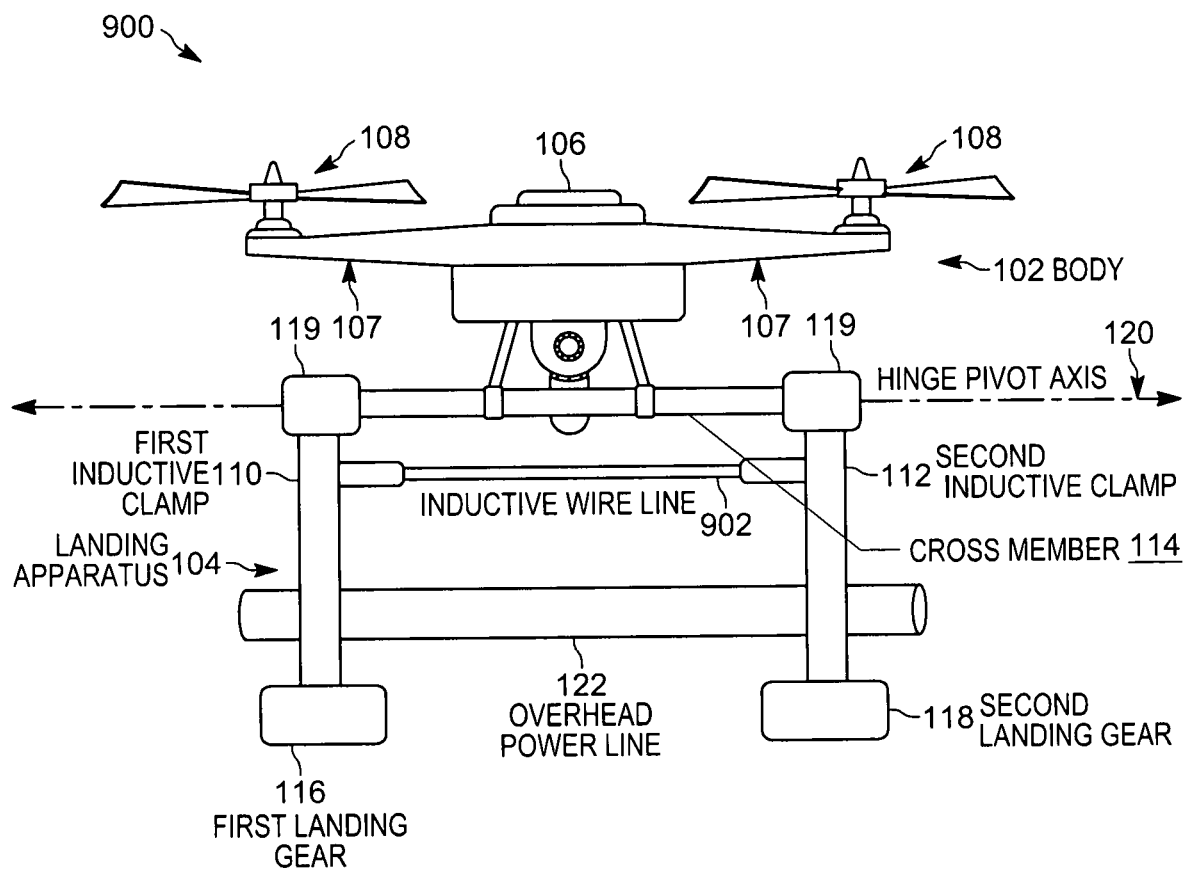
FIG. 9 is a diagram of an unmanned aerial vehicle in accordance with some embodiments.
Figure 10:
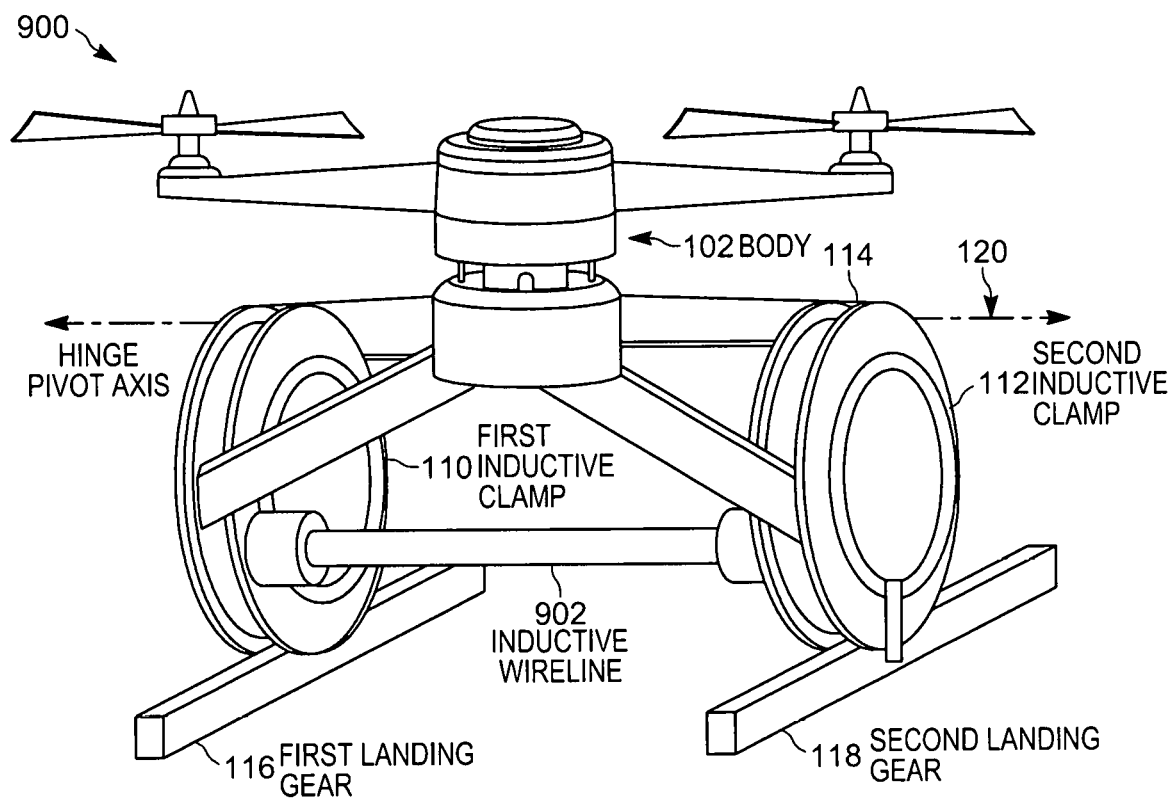
FIG. 10 illustrates a perspective view of the unmanned aerial vehicle of FIG. 9 in accordance with some embodiments.

FIG. 9 illustrates another example embodiment of an unmanned aerial vehicle 900. The unmanned aerial vehicle 900 is configured similarly and operates similarly to the unmanned aerial vehicle 900. Like components are identified with like reference numerals in FIG. 9, and have been described above with respect to FIG. 1. The unmanned aerial vehicle 900 differs from the unmanned aerial vehicle 100 in at least that it includes an inductive wire line 902 attached between the first inductive clamp 110 and the second inductive clamp 112. The inductive wire line 902 includes a flexible ferrite core and one or more flexible conductive windings. The inductive wire line 902 is electrically coupled to the charging circuit 208. FIG. 10 illustrates a perspective view of the unmanned aerial vehicle 900.

Figure 11:
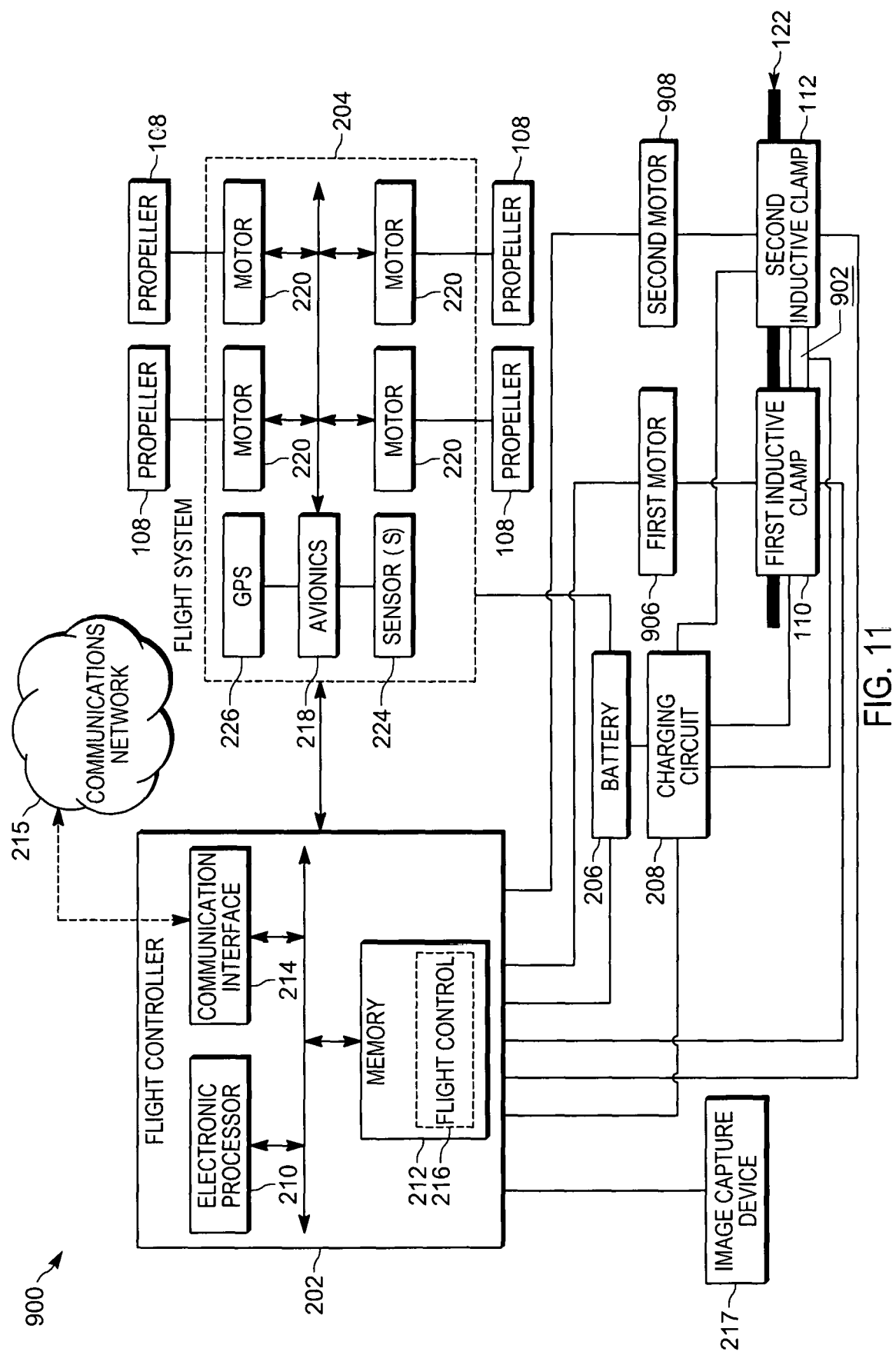
FIG. 11 is a block diagram of some systems of the unmanned aerial vehicle of FIG. 9 in accordance with some embodiments.

FIG. 11 is a block diagram of an example embodiment of the unmanned aerial vehicle 900. As with FIG. 9, similarly components between the unmanned aerial vehicle 900 and the unmanned aerial vehicle 100 are labeled similarly. As illustrated in FIG. 11, the unmanned aerial vehicle 900 includes a first motor 906 and a second motor 908, which are positioned on the first inductive clamp 110 and the second inductive clamp 112, respectively. The first motor 906 and the second motor 908 communicatively coupled to and controllable by the flight controller 202. As described in detail below, the first motor 906 and the second motor 908 can be operated to twist the inductive wire line 902 around the overhead power line 122. In some embodiments, the inductive wire line 902 is partially stored within a suitable storage mechanism (not shown), such that the operation of the first motor 906 and the second motor 908 causes the inductive wire line 902 to be drawn from or retract into the storage mechanism.

Figure 12:
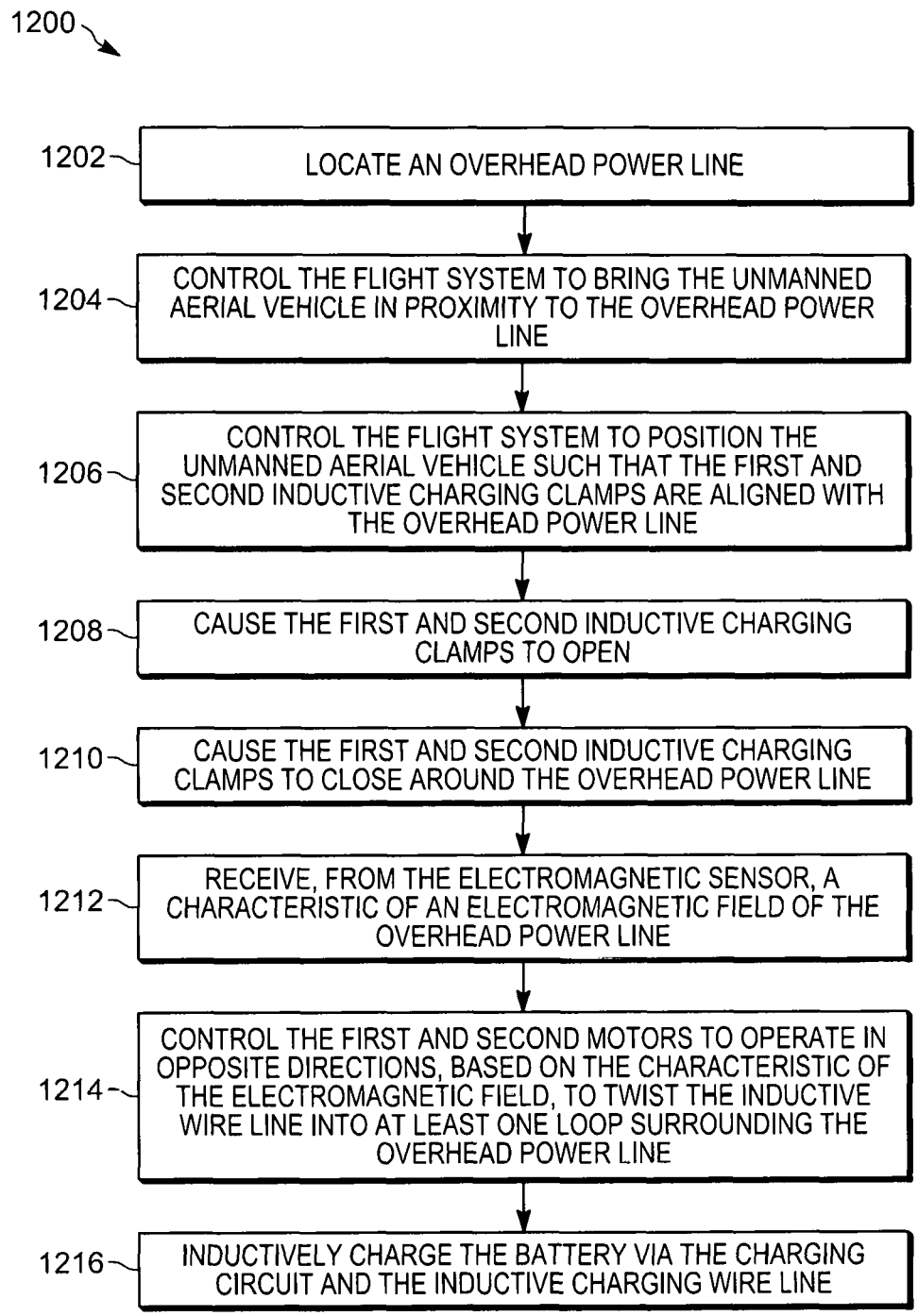
FIG. 12 is a flowchart of a method for operating the unmanned aerial vehicle of FIG. 9 in accordance with some embodiments.

FIG. 12 illustrates an example method 1200 for operating the unmanned aerial vehicle 900 to recharge the battery 206 using overhead power lines. The method 1200 is described as being performed by the flight controller 202. However, it should be understood that in some embodiments, portions of the method 1200 may be performed by other components, including for example, the avionics system 218. In some embodiments, portions of the method 1200 may be performed by remote systems external to the unmanned aerial vehicle 100, for example, a central flight control or monitoring system communicating with the flight controller 202 via the communication interface 214.

At block 1202, the flight controller 202, when a charge level for the battery 206 falls below a predetermined threshold, locates an overhead power line, as described above with respect to FIG. 5.

At block 1204, the flight controller 202 controls the flight system 204 to bring the unmanned aerial vehicle 100 in proximity to the overhead power line 122, as described above with respect to FIG. 5.

At block 1206, the flight controller 202 controls the flight system 204 to position the unmanned aerial vehicle 100 such that the first and second inductive charging clamps 110, 112 are aligned with the overhead power line 122, as described above with respect to FIG. 5.

At block 1208, the flight controller 202 causes the first and second inductive charging clamps 110, 112 to open. As described above with respect to FIG. 5, after the first and second inductive clamps 110, 112 are aligned with the overhead power line 122 and opened, the flight controller 202 controls the flight system 204 to position the unmanned aerial vehicle 100 such that the first and second inductive clamps 110, 112 substantially surround the overhead power line 122.

At block 1210, the flight controller 202 causes the first and second inductive charging clamps 110, 112 to close around the overhead power line 122.

At block 1212, the flight controller 202 receives, from an electromagnetic sensor, for example, the sensor 224, a characteristic of an electromagnetic field of the overhead power line 122.

Figure 13:
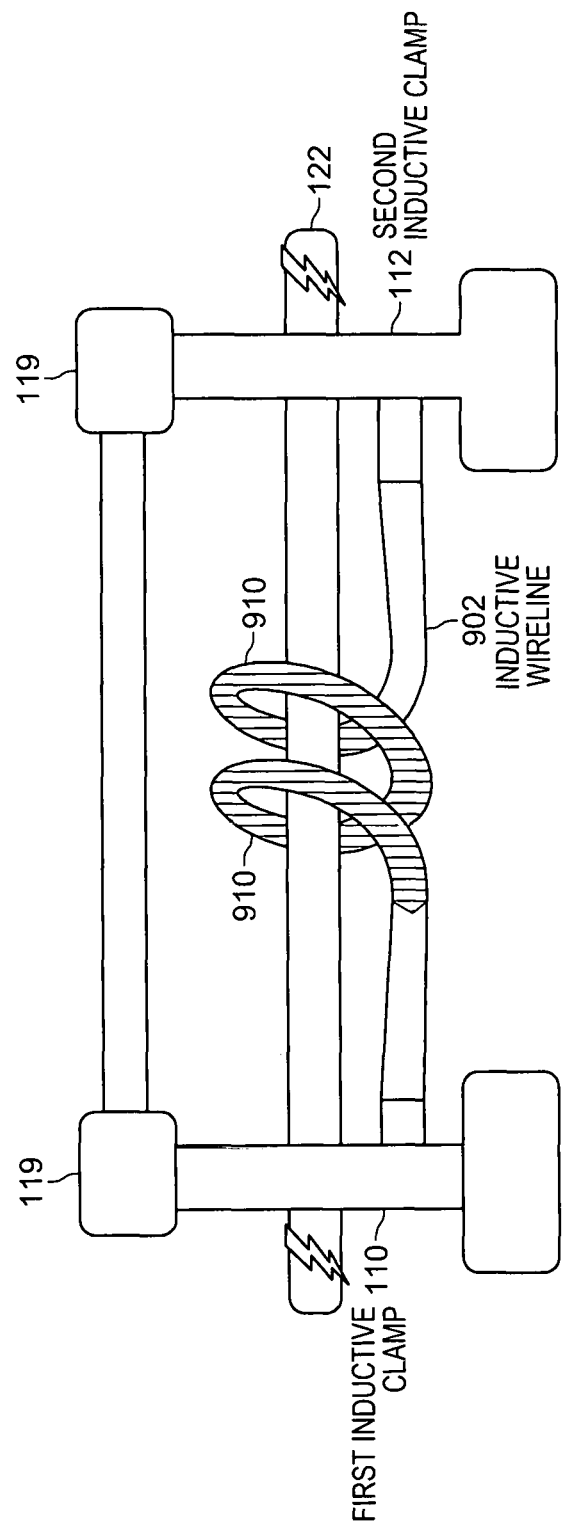
FIG. 13 illustrates the unmanned aerial vehicle of FIG. 9 engaging with an overhead power line in accordance with some embodiments.

At block 1214, the flight controller 202 controls the first and second motors 906, 908 to operate in opposite directions to twist the inductive wire line 902 into at least one loop surrounding the overhead power line 122, as illustrated in FIG. 13. The operation of the first and second motors 906, 908, and thus the number of loops created, is based on the characteristic of the electromagnetic field. For example, the strength of the magnetic field may be used to determine how many loops will provide efficient power transfer, based on the characteristics of the inductive wire line 902 and the magnetic field strength. In some embodiments, the electrical characteristics of the first and second inductive charging clamps 110, 112 are altered by adding loops to the inductive wire line 902 to achieve a more efficient power transfer from all three inductive sources. In some embodiments, the flight controller 202 monitors the charging current produced by the charging circuit 208, and adds or removes loops accordingly based on the current.

At block 1216, the flight controller 202 inductively charges the battery 206 via the charging circuit 208 using current received from the inductive wire line 902. In some embodiments, current from the first and second inductive charging clamps 110, 112 is also used to charge the battery 206.

Embodiments presented herein may further be extended to a power monitoring system which can beneficially detect theft of power from unauthorized users. On example power monitoring system operates using one or more unmanned aerial vehicles as described above, with the the flight controller 202 being further configured to provide power monitoring capability. For example, the flight controller 202, as previously described, locates an overhead power line 122, brings the unmanned aerial vehicle 100 in proximity to the overhead power line 122, and positions the unmanned aerial vehicle 100 to align the first and second inductive clamps 110, 112 with the overhead power line 122. The flight controller 202 causes the first and second inductive clamps 110, 112 to open and close around the overhead power line 122. The flight controller 202 then measures power drain between the first and second inductive clamps 110, 112, and detects when the power drain exceeds a predetermined threshold. In some embodiments, the flight controller 202 compares the currents passing through the overhead power line 122 to monitor power on the overhead power line 122. In some embodiments, two unmanned aerial vehicles, in communication with each other, position themselves on a power line and measure the power drain from the power line between their positions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An unmanned aerial vehicle, comprising:
    a flight controller;
    an electromagnetic sensor coupled to the flight controller;
    a flight system communicatively coupled to the flight controller;
    a first clamp including a first motor;
    a second clamp including a second motor;
    an inductive wire line mechanically coupled to the first clamp and the second clamp; and
    an inductive circuit electrically coupled to the inductive wire line;
    wherein the flight controller is configured to,
        locate an overhead power line;
        control the flight system to bring the unmanned aerial vehicle in proximity to the overhead power line;
        control the flight system to position the unmanned aerial vehicle such that the first and second clamps are aligned with the overhead power line;
        cause the first and second clamps to open;
        cause the first and second clamps to close around the overhead power line;
        receive, from the electromagnetic sensor, a characteristic of an electromagnetic field of the overhead power line;
        control the first and second motors to operate in opposite directions, based on the characteristic of the electromagnetic field, to twist the inductive wire line into at least one loop surrounding the overhead power line; and
        inductively couple the inductive wire line to the overhead power line.

2. The unmanned aerial vehicle of claim 1, further comprising:
    a battery; and
    a charging circuit electrically coupled to the battery and the inductive wire line;
    wherein the flight controller is further communicatively coupled to the battery and the charging circuit.

3. The unmanned aerial vehicle of claim 2, wherein the flight controller is further configured to
    locate the overhead power line when a charge level for the battery falls below a predetermined threshold; and
    inductively charge the battery via the charging circuit and the inductive wire line.

4. The unmanned aerial vehicle of claim 3, wherein the flight controller is further configured to, while inductively charging the battery, cause the flight system to enter an idle state such that the unmanned aerial vehicle hangs from the overhead power line by the first and second clamps in a substantially vertical position.

5. The unmanned aerial vehicle of claim 4, wherein the flight controller is further configured to
    receive, via a transceiver, a call to service;
    cause the flight system to enter an active state;
    in response to receiving the call to service, cause the first and second clamps to open; and
    control the flight system to place the unmanned aerial vehicle into a flight stable position.

6. The unmanned aerial vehicle of claim 3, wherein the flight controller is further configured to, while inductively charging the battery, control the flight system such that the unmanned aerial vehicle remains flight stable.

7. The unmanned aerial vehicle of claim 1, further comprising:
    a first landing gear mechanically coupled to and electrically isolated from the first clamp; and
    a second landing gear mechanically coupled to and electrically isolated from the second clamp.

8. The unmanned aerial vehicle of claim 1, further comprising:
    an image capture device;
    wherein the flight controller is further configured to locate the overhead power line based on images received from the image capture device.

9. The unmanned aerial vehicle of claim 1, further comprising:

an image capture device;
wherein the flight controller is further configured to control the flight system to position the unmanned aerial vehicle such that the first and second clamps are aligned with the overhead power line based on thermal images received from the image capture device.

10. A method for controlling an unmanned aerial vehicle, the method comprising:
locating, with a flight controller, an overhead power line;
controlling a flight system communicatively coupled to the flight controller to bring the unmanned aerial vehicle in proximity to the overhead power line;
controlling the flight system to position the unmanned aerial vehicle such that a first clamp and a second clamp of the unmanned aerial vehicle are aligned with the overhead power line;
causing the first and second clamps to open;
causing the first and second clamps to close around the overhead power line;
receiving, from an electromagnetic sensor coupled to the flight controller, a characteristic of an electromagnetic field of the overhead power line;
controlling a first motor of the first clamp and a second motor of the second clamp to operate in opposite directions, based on the characteristic of the electromagnetic field, to twist an inductive wire line mechanically coupled to the first clamp and the second clamp into at least one loop surrounding the overhead power line; and
inductively coupling the inductive wire line to the overhead power line.

11. The method of claim 10, further comprising:
after the first and second clamps are aligned with the overhead power line and opened, controlling the flight system to position the unmanned aerial vehicle such that the first and second clamps substantially surround the overhead power line.

12. The method of claim 10, further comprising:
locating the overhead power line when a charge level for a battery of the unmanned aerial vehicle falls below a predetermined threshold; and
inductively charging the battery via a charging circuit electrically coupled to the battery and the inductive wire line.

13. The method of claim 12, further comprising:
while inductively charging the battery, causing the flight system to enter an idle state such that the unmanned aerial vehicle hangs from the overhead power line by the first and second clamps in a substantially vertical position.

14. The method of claim 13, further comprising:
receiving, via a transceiver, a call to service;
causing the flight system to enter an active state;
in response to receiving the call to service, causing the first and second clamps to open; and
controlling the flight system to place the unmanned aerial vehicle into a flight stable position.

15. The method of claim 12, further comprising:
while inductively charging the battery, controlling the flight system such that the unmanned aerial vehicle remains flight stable.

16. The method of claim 10, wherein locating the overhead power line includes using at least one selected from the group consisting of images received from an image capture device, a geolocation system, an electromagnetic sensor, and a radiofrequency beacon.

17. The method of claim 10, further comprising:
receiving, by the flight controller, permission to attach to the overhead power line.

18. An unmanned aerial vehicle, comprising:
a flight controller;
an electromagnetic sensor coupled to the flight controller;
a flight system communicatively coupled to the flight controller;
a battery;
a first clamp including a first motor;
a second clamp including a second motor;
an inductive wire line mechanically coupled to the first clamp and the second clamp; and
a charging circuit electrically coupled to the inductive wire line and the battery;
wherein the flight controller is configured to, when a charge level for the battery falls below a predetermined threshold,
locate an overhead power line;
control the flight system to bring the unmanned aerial vehicle in proximity to the overhead power line;
control the flight system to position the unmanned aerial vehicle such that the first and second clamps are aligned with the overhead power line;
cause the first and second clamps to open;
cause the first and second clamps to close around the overhead power line;
receive, from the electromagnetic sensor, a characteristic of an electromagnetic field of the overhead power line;
control the first and second motors to operate in opposite directions, based on the characteristic of the electromagnetic field, to twist the inductive wire line into at least one loop surrounding the overhead power line; and
inductively charge the battery via the charging circuit and the inductive wire line.

* * * * *